United States Patent
Justin et al.

(10) Patent No.: US 11,243,619 B2
(45) Date of Patent: Feb. 8, 2022

(54) INFORMATION HANDLING SYSTEM STYLUS WITH INTEGRATED PUSH BUTTON AND CHARGING PORT

(71) Applicant: Dell Products L.P., Round Rock, TX (US)

(72) Inventors: Wong Hin Loong Justin, Singapore (SG); Kai Leong Wong, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/916,376

(22) Filed: Jun. 30, 2020

(65) Prior Publication Data

US 2021/0405776 A1   Dec. 30, 2021

(51) Int. Cl.
*G06F 3/0354* (2013.01)
*G06F 3/038* (2013.01)
*H02J 7/00* (2006.01)
*G06F 3/041* (2006.01)

(52) U.S. Cl.
CPC ........ *G06F 3/03545* (2013.01); *G06F 3/0383* (2013.01); *H02J 7/0042* (2013.01); *G06F 3/041* (2013.01); *G06F 2203/0384* (2013.01)

(58) Field of Classification Search
CPC ..... G06F 3/03545; G06F 3/0383; G06F 3/041
USPC ........................................................ 345/174
See application file for complete search history.

(56) References Cited

U.S. PATENT DOCUMENTS

| 9,013,455 | B2 | 4/2015 | Mercea et al. |
| 9,268,379 | B2 | 2/2016 | Ashcraft et al. |
| 11,068,081 | B1* | 7/2021 | Kanas .................... G06F 1/1607 |
| 2013/0100086 | A1* | 4/2013 | Kim ..................... G06F 3/03545 |
| | | | 345/179 |
| 2020/0053196 | A1* | 2/2020 | Park ..................... G06F 3/04162 |

FOREIGN PATENT DOCUMENTS

| EP | 3267554 B1 | 2/2019 |
| EP | 2656183 B1 | 7/2019 |

* cited by examiner

*Primary Examiner* — Calvin C Ma
(74) *Attorney, Agent, or Firm* — Zagorin Cave LLP; Robert W. Holland (57) ABSTRACT

An information handling system stylus makes inputs to a touchscreen display with a writing tip disposed at one end of a cylindrical housing. In an opening at the end of the cylindrical housing opposite the writing tip, a port and a push button are disposed under a removeable flexible cap to provide a cable connection for charging the stylus when the cap is removed and an input device to activate a wireless function when the flexible cap is in place, such as by translating end user pushes through a steel plate integrated in the flexible cap. An attachment member extends from the flexible cap into a sliding engagement with an end cap so that the flexible cap lifts out of the opening and flexes about the attachment member to expose the port in the opening.

20 Claims, 12 Drawing Sheets

INFORMATION HANDLING SYSTEM STYLUS WITH INTEGRATED PUSH BUTTON AND CHARGING PORT

BACKGROUND OF THE INVENTION

Field of the Invention

The present invention relates in general to the field of information handling system input devices, and more particularly to an information handling system stylus with integrated push button and charging port.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. In some instances, a main housing portion integrates processing components and a keyboard and rotationally couples with hinges to a lid housing portion that integrates a display. In other instances, both housing portions may integrate a display so that one of the displays may be used for typed inputs made at a virtual keyboard presented as an image with key inputs detected as touches. Including a touchscreen display in a convertible information handling system enhances end user interactions.

One tool commonly used with a touchscreen display is a stylus. A stylus typically has a pen form factor, such as a cylindrical housing, and terminates at one end with a writing tip so that an end user can write on a touchscreen display surface as if writing with a pen. Often the writing tip interfaces with an active capacitance circuit that increases touch detection at the touchscreen display. In some instances, the pen includes processing components and wireless communication components, such as a Bluetooth system on chip (SOC), so that an information handling system can interface with and control stylus functions. An end user typically activates Bluetooth at the stylus, such as with an advertising button, and can then draw and write on the touchscreen display to input information.

One difficulty with conventional stylus devices is that the integration of processing resources, a battery and wireless communication resources tend to increase the size of the stylus so that it feels less like a pen. In addition, the stylus form factor is also enlarged to provide space for a charging port and push button. Generally, the charging port and push button are included along a side of the cylindrical housing, further differentiating the stylus from a pen form factor and sometimes interfering with and end user grasp. In some instances, a charging port is provided at the end of the stylus opposite the writing tip so that it does not interfere with an end user grasp at the side of the stylus, however, even with this disposition the push button is typically exposed in a manner that interferes with the end user's interactions.

SUMMARY OF THE INVENTION

Therefore, a need has arisen for a system and method which integrates a charger port and push button in a stylus without interfering with end user interactions with the stylus.

In accordance with the present invention, a system and method are provided which substantially reduce the disadvantages and problems associated with previous methods and systems for integrating a charger and push button in an information handling system stylus. As stylus cylindrical housing terminates at one end with a writing tip and at an opposing end with an opening having a charging portion and push button disposed therein. A flexible cap removably couples over the opening to cover the port and accept pushes in the covered position that translate to the push button.

More specifically, an information handling system processes information with processing components disposed in a housing, such as processor and memory, and presents the information as visual images at a touchscreen display that detects inputs as touches. A stylus has a cylindrical housing that terminates at one end with a writing tip and terminates at an opposing end with an opening having an end cap inserted that supports a port and a push button. A flexible cap couples to the end cap with an attachment member that slidingly engages to provide in and out movement of the flexible cap and rotation of the end cap to expose the port in the opening to accept a cable for charging. The flexible cap is made of rubberized plastic that flexes in response to a touch in the closed position to accept inputs to the touch button, such as to activate wireless communications functions like advertisement. In one embodiment, a metal plate is insert molded in the flexible cap to improve translation of end user pushes to the push button.

The present invention provides a number of important technical advantages. One example of an important technical advantage is that an information handling system stylus integrates both a touch button and a charging port in an opening at an end of the stylus opposite the writing tip. A flexible cap removably covers the charging port for protection from contaminants and flexes to accept push inputs to the touch button. An attachment member extends from the flexible cap and is captured by the end cap so that the flexible cap remains coupled to the stylus during charging. Including the push button under the flexible cap provides a sleek cylindrical housing that does not have a Bluetooth push button exposed along the side surface to interfere with end user interactions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system stylus provides access to a port and a button disposed in an opening at one end through a flexible cap that selectively removes to expose the port and flexes when in place to accept inputs to the button. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
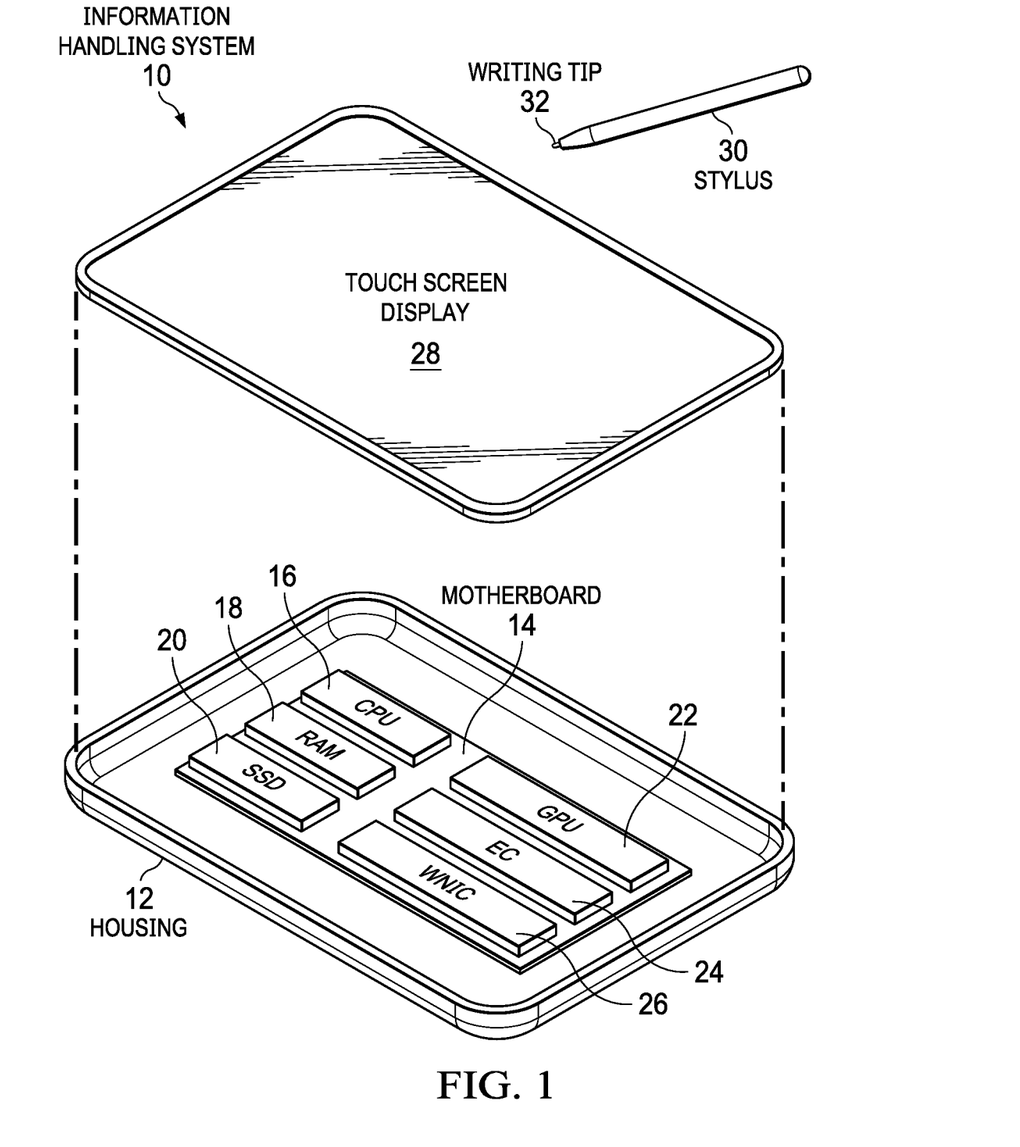
FIG. 1 depicts an exploded view of an information handling system having a stylus that writes on an integrated touchscreen.

Referring now to FIG. 1, an exploded view depicts an information handling system 10 having a stylus 30 that writes on an integrated touchscreen 28. In the example embodiment, information handling system 10 has a tablet configuration built in a planar housing 12 that contains processing components that cooperate to process information. For example, a motherboard 14 interfaces a central processing unit (CPU) 16 that executes instructions to process information with a random access memory (RAM) 18 that stores the instructions and information. A solid state drive (SSD) 20 provides non-transient memory that stores information during power down of the system, such as an operating system and applications that are retrieved to RAM 18 at power up to execute on CPU 16. A graphics processor unit (GPU) 22 interfaces with CPU 16 to process information for presentation as visual images at touchscreen display 28, such as by defining pixel values that are communicated to touchscreen display 28. An embedded controller 24 manages physical operating conditions for the processing components, such as power and thermal conditions, and manages inputs made at input devices, such as touches that are reported from touchscreen display 28. A wireless network interface card (WNIC) 26 provides communication through wireless signals, such as through WiFi and Bluetooth wireless signals. Stylus 30 has a writing tip 32 at one end that touches touchscreen display 28 to make writing/drawing inputs that are communicated to CPU 16 and presented as visual images. In the example embodiment, stylus 30 is built in a cylindrical housing similar to a pen or other writing utensil that an end user might use to write on paper. Although the example embodiment depicts a tablet configuration of information handling system 10, stylus 30 may write on any touchscreen display in other types of information handling systems, such as convertible systems or touchscreen displays that interface with desktop information handling systems.

Figure 2:
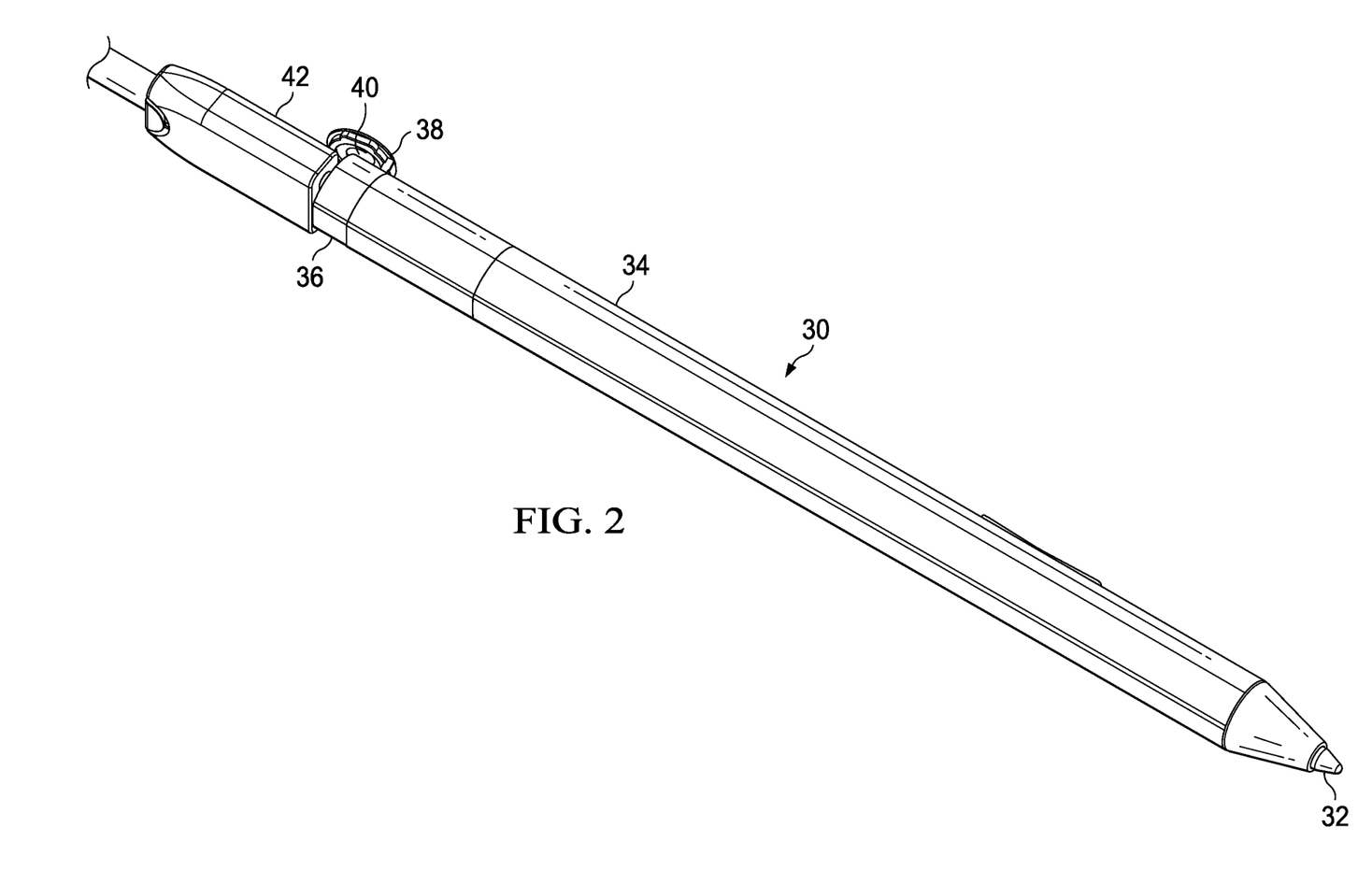
FIG. 2 depicts a side perspective view of a stylus having a charging plug inserted into a port integrated in an opening at one end.

Referring now to FIG. 2, a side perspective view depicts a stylus 30 having a charging plug 42 inserted into a port integrated in an opening at one end. As an example, stylus 30 integrates processing resources and a Bluetooth transceiver that cooperate at adjusting capacitive characteristics of writing tip 32 so that writing tip 32 provides a touch detectable by a touchscreen display. To charge a battery that supports the processing resources and Bluetooth transceiver, a USB Type C or other port integrates into the interior of a cylindrical housing 34 that contains the processing resources and writing tip 32. An end cap 36 couples to cylindrical housing 34 at the opening and holds a flexible cap 38 that exposes and covers the opening of cylindrical housing 34 as needed to support charging by charging plug 42, such as through a USB cable interfaced with charging plug 42. In the example embodiment, flexible cap 38 rotates about an attachment member that slidingly engages in end cap 36 to expose the port for charging. A metal plate 40 integrates within flexible cap 38, such as through insert injection molding, to provide a firm surface for transfer of touch inputs at flexible cap 38 when in the closed position to a button disposed in the opening.

Figure 3:
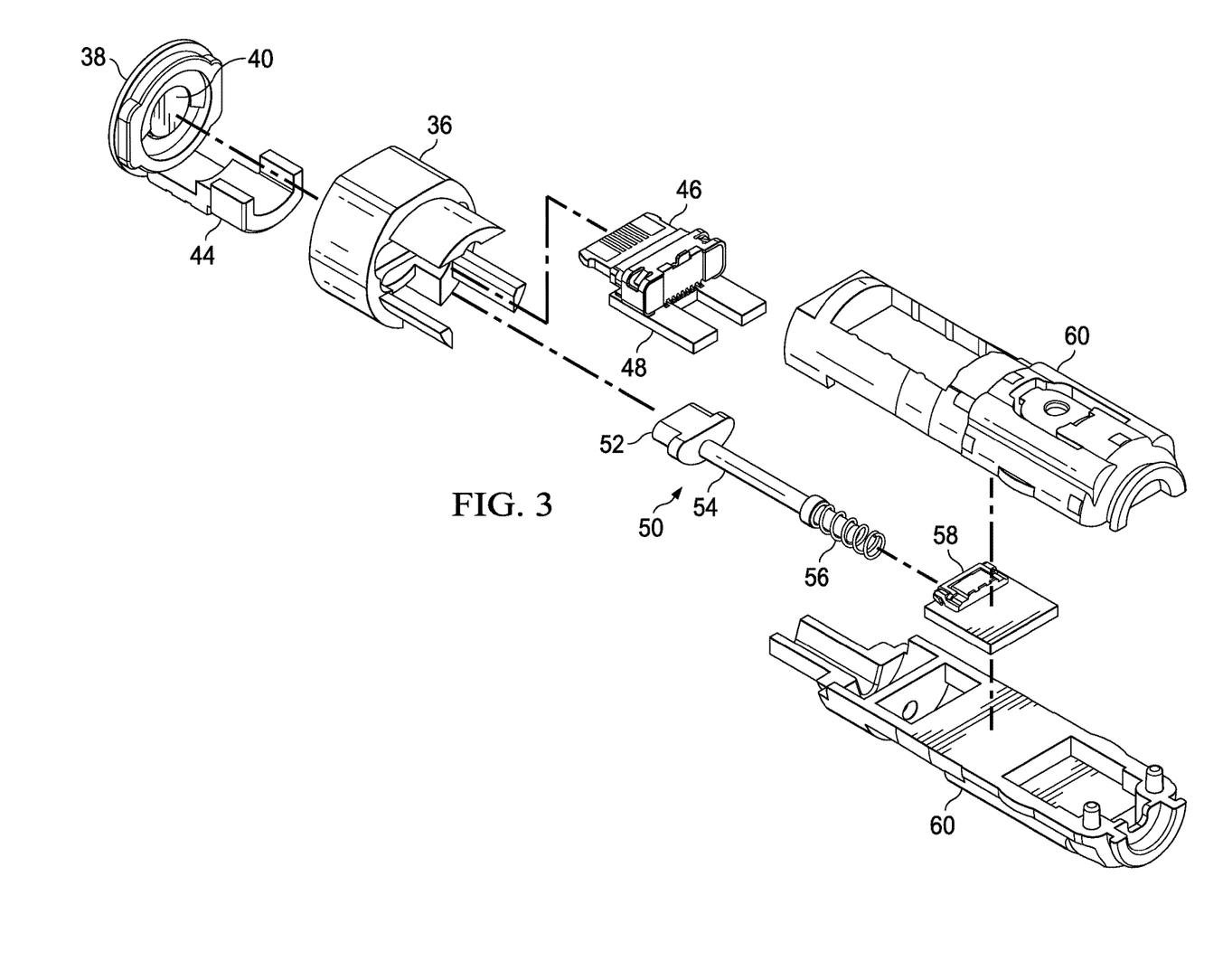
FIG. 3 depicts an exploded view of components disposed within the stylus to accept charging and touch inputs at the end opening.

Referring now to FIG. 3, an exploded view depicts components disposed within the stylus to accept charging and touch inputs at the end opening. An internal housing 60 assembles in two portions to capture internal components for assembly within the cylindrical housing. End cap 36 couples to internal housing 60 to hold the components in a fixed position relative to the cylindrical housing. An attachment member 44 couples to flexible cap 38, such as with integration provided injection molding using a soft or rubberized plastic, and fits in a sliding relationship between end cap 36 and the cylindrical housing with tabs formed at the end of attachment member 44 preventing sliding movement from pulling attachment member 44 out of the stylus. A port 46 couples to end cap 36 and a guide 48 that may be a printed circuit board for communicating power from port 46 to a battery and charger held within internal housing 60 or other portions of the stylus. A push button 50 has an actuation end 52 that accepts end user touches for communication through a member 54 to a switch 58. A spring 56 or other biasing device is disposed on member 54 to bias actuation end 52 out towards flexible cap 38. A neck formed in internal housing 60 and edges of guide 48 maintain push button 50 in place to translate pushes at actuation end 52 to switch 58. Switch 58 is, for example, interfaced with a Bluetooth transceiver to command various Bluetooth functions, such as based upon the number of pushes and timing of pushes. In one example embodiment, the Bluetooth transceiver integrates with switch 58 as a system on chip. Alternatively, switch 58 may interface with a separate system on chip through a printed circuit board. A push at switch 58 may wake the transceiver by applying power, initiate advertisement, disconnect an established interface, and power down the Bluetooth transceiver, such as based upon the number of pushes and the timing of pushes.

Figure 4:
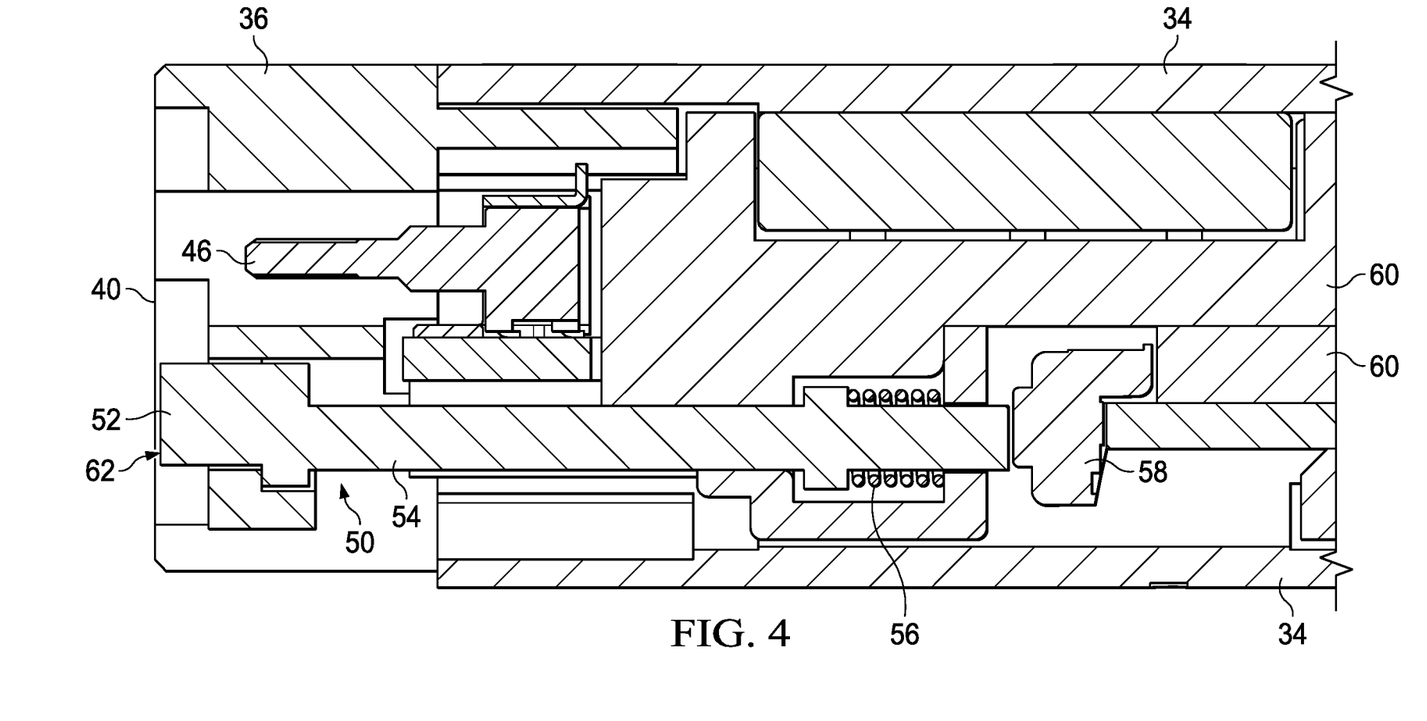
FIG. 4 depicts a side cutaway view of the port and push button coupled to the stylus by the end cap to accept a power cable and push button touches.

Referring now to FIG. 4, a side cutaway view depicts port 46 and push button 50 coupled to the stylus by end cap 36 to accept a power cable and push button touches. Actuation end 52 is held in a position proximate the opening of end cap 36 to accept presses through the flexible cap when it covers the opening. A stopper feature 62 formed in end cap 36 restricts outward motion of actuation end 52 against bias introduced by spring 56 working against housing 60. Presses against actuation end 52 translate through member 54 past port 46 and against switch 58, which commands Bluetooth functions based upon the type of push. Port 46 is coupled in place by guide 48 that provides a printed circuit board to accept power from an external cable source inserted through the opening of end cap 36. End cap 36 couples to cylinder housing 34 to provide support that maintains the position of port 46 against transverse forces introduced by a cable plug. For example, end cap 36 is a metallic material, such as aluminum.

Figure 5:
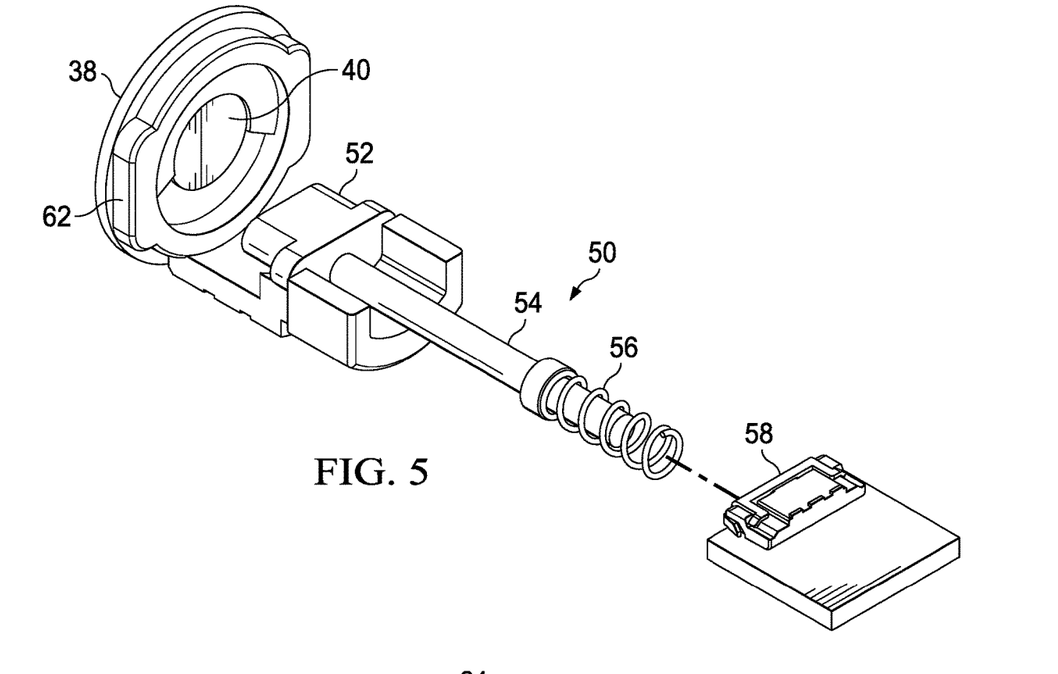
FIG. 5 depicts a side perspective view of an example embodiment of the push button aligned to cooperate with the flexible cap to accept end user inputs.

Referring now to FIG. 5, a side perspective view depicts an example embodiment of push button 50 aligned to cooperate with flexible cap 38 to accept end user inputs. In the example embodiment, actuation end 52 is disposed along a central portion of attachment member 44 with member 54 extending through the tab features of attachment member 44 to translate presses against switch 58. A metal plate 40, such as a steel plate, insert molds into flexible cap 38 and aligns with actuation end 52 to provide stiffness that aids in translation of presses to actuation end 52. A fit feature 62 is formed at the perimeter of flexible cap 38 to align with an opposing feature of the end cap. Tab features formed the end of attachment member 44 engage against the bottom surface of actuation end 52 to restrict sliding motion of attachment member 44 and prevent its removal from the stylus. When flexible cap 38 is lifted with a sliding motion to aid rotation that exposes the port, pushes at actuation end 52 are typically not needed. Engagement of actuation end 52 against the end cap thus restricts removal of attachment member 44 from the stylus. As an example, attachment member 44 has a sliding motion of approximately 1.3 mm and includes ribs cut into its length that aids in rotational movement once lifted out of the stylus to aid rotation that uncovers the port.

Figure 6:
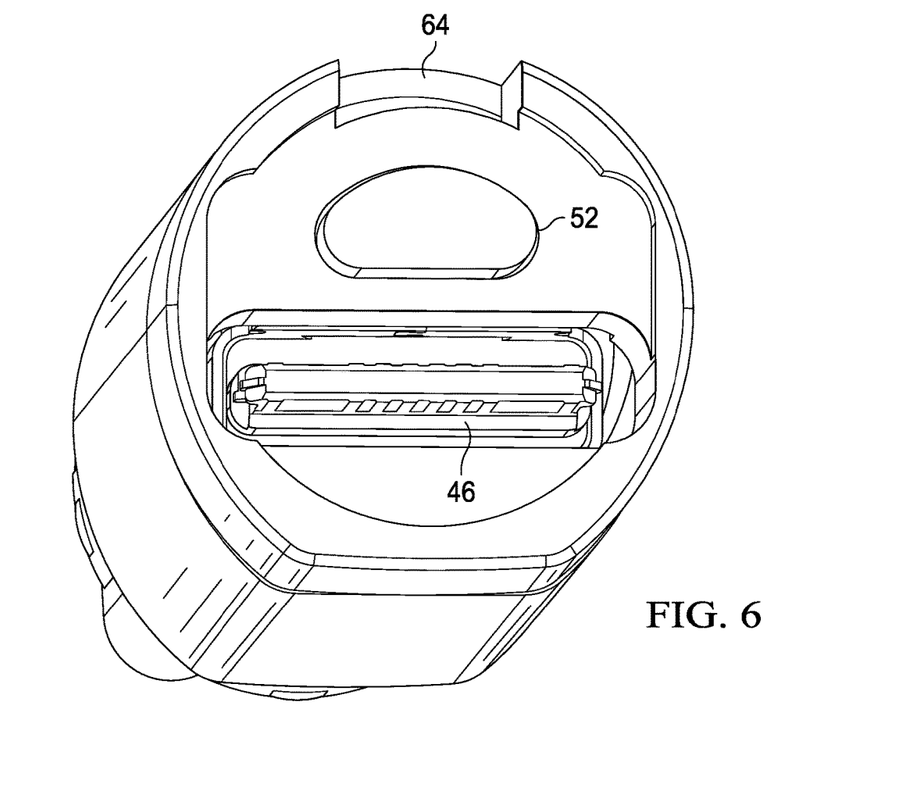
FIG. 6 depicts a side view of the end of the stylus with the flexible cap removed to show the push button and port.

Referring now to FIG. 6, a side view depicts the end of the stylus with the flexible cap removed to show the push button actuation end 52 and port 46. A coupling point 64 formed in end cap 36 accepts the attachment member of the flexible cap to provide a rotation point for exposing the opening at the end of the stylus to insert a charging cable plug into port 46. In the example embodiment, port 46 is a USB Type C port that can accept external power and data transfers. Features to engage against the flexible cap are integrated in end cap 36 on opposing sides of port 46, such as to engage against and hold the flexible cap in place when put over the opening.

Figure 7A:
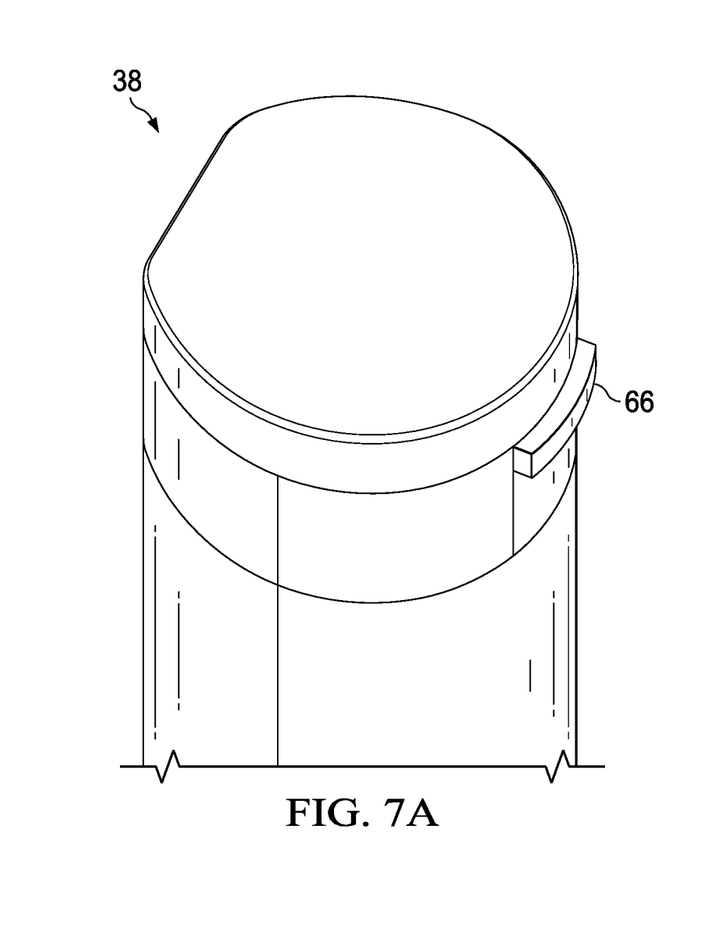
FIGS. 7A, 7B, 7C, 7D and 7E depict a side perspective view of the stylus with the flexible cap disposed over the end cap to cover the port and push button.
Figure 7B:
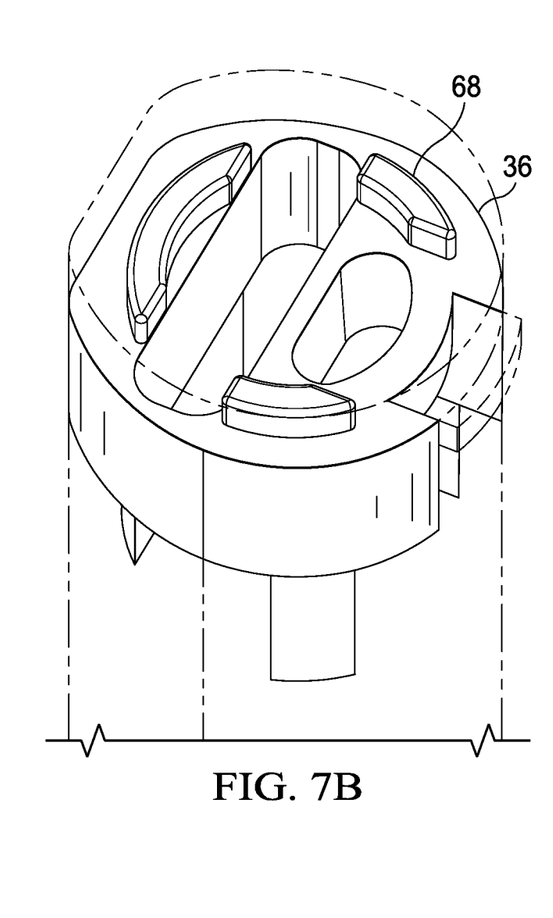
Figure 7C:
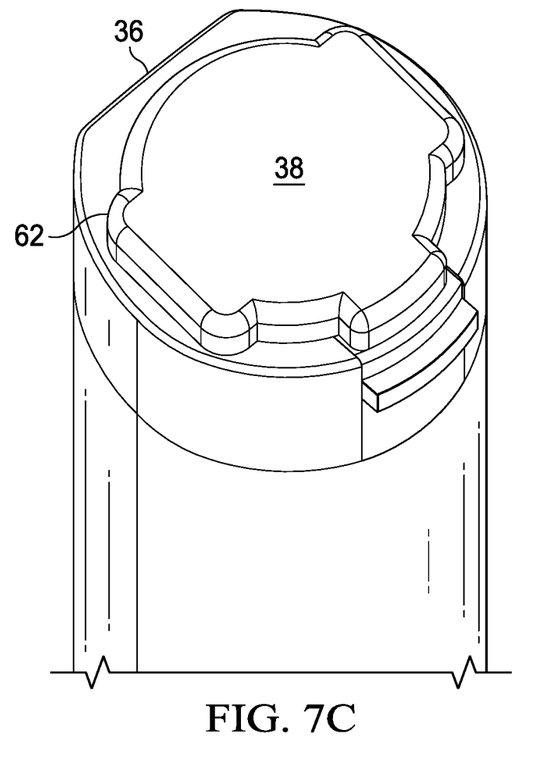
Figure 7D:
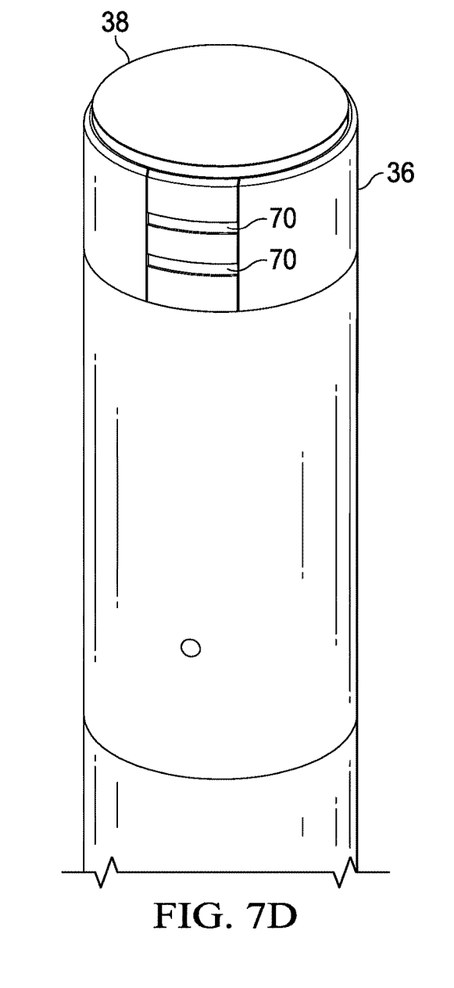
Figure 7E:
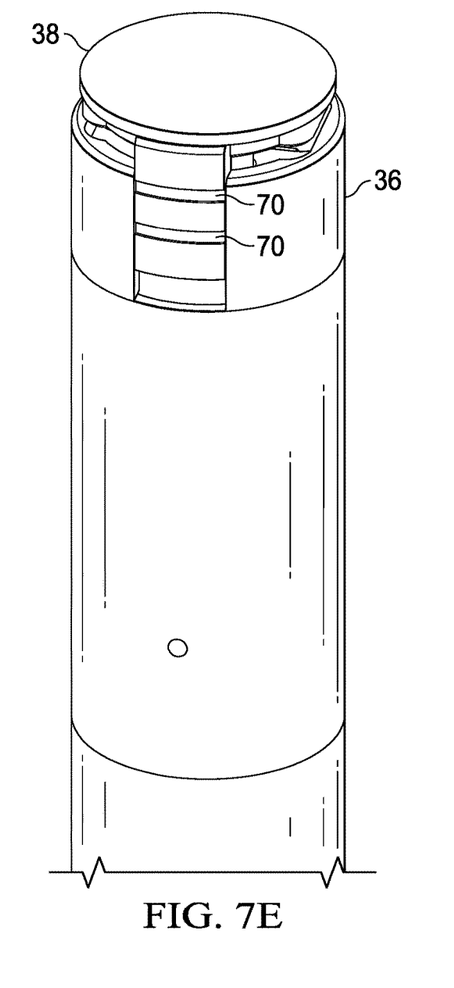

Referring now to FIGS. 7A, 7B, 7C, 7D and 7E, a side perspective view depicts the stylus with the flexible cap 38 disposed over the end cap 36 to cover the port and push button. FIG. 7A depicts flexible cap 38 in a closed position that covers and protects the port and push button. In the closed position flexible cap 38 flexes in response to a touch to transfer an input to the push button, such as aided by stiffness of an integrated metal plate. Flexible cap 38 is injection molded with the metal plate using a rubberized plastic, such as TPE, or silicon material. A rib 66 protruding out from one side of flexible cap 38 at the attachment member a location where an end user finger can fit to pull outward and slide flexible cap 38 and the attachment member out of end cap 36. This outward motion provides separation of flexible cap 38 from the interior structure of end cap 36 to aid a rotational movement about the attachment member that removes flexible cap 38 and exposes the port underneath. FIG. 7B depicts end cap 36 with the flexible cap removed. Structures 68 disposed at the upper surface of end cap 36 define an inner circumference that aligns with the steel plate of the flexible cap to direct pushes against the push button. FIG. 7C depicts an upper perspective cross sectional view of flexible cap 38 coupled to end cap 36 with an upper layer of the assembly removed. Fit feature 62 presses against a corresponding structure of end cap 36 to hold flexible cap 38 in place when placed over the opening at the end of the stylus. FIG. 7D depicts a side perspective view of the stylus having flexible cap 38 coupled over the opening and pushed into end cap 36 to a fully engaged position. Flexible cap 38 is formed to have a domed upper surface on which an end user may press to interact with the push button. Ribs 70 formed in the side of the attachment member provides rotational points about which the attachment member yields to rotate and expose the port. FIG. 7E depicts flexible cap 38 lifted slightly out of end cap 36 by a sliding motion of the attachment member within end cap 36. The slight outward movement, such as approximately 1.3 mm, frees flexible cap 38 inner structure from end piece 36 inner structure provide more ease for rotation about ribs 70 to expose the stylus end opening.

Figure 8A:
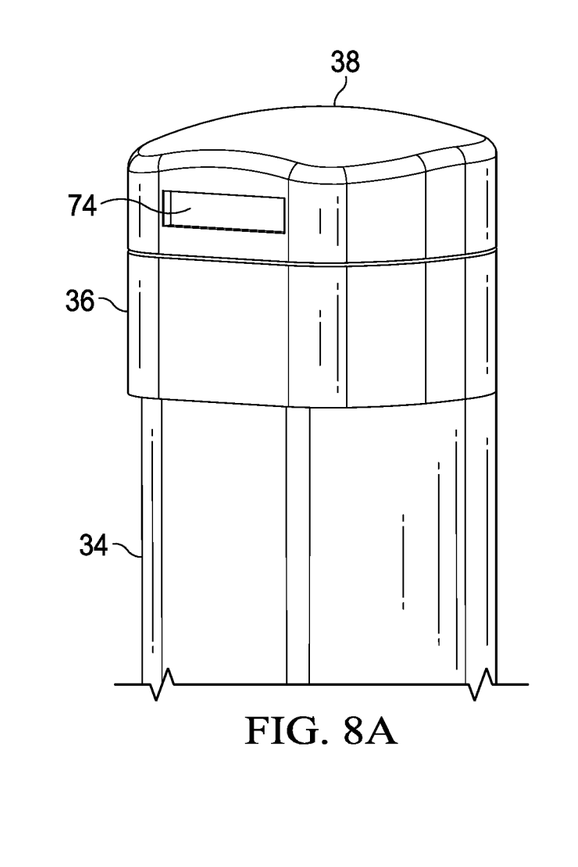
FIGS. 8A, 8B, 8C, 8D, 8E and 8F depict an alternative embodiment of the stylus end cap and flexible cap.
Figure 8B:
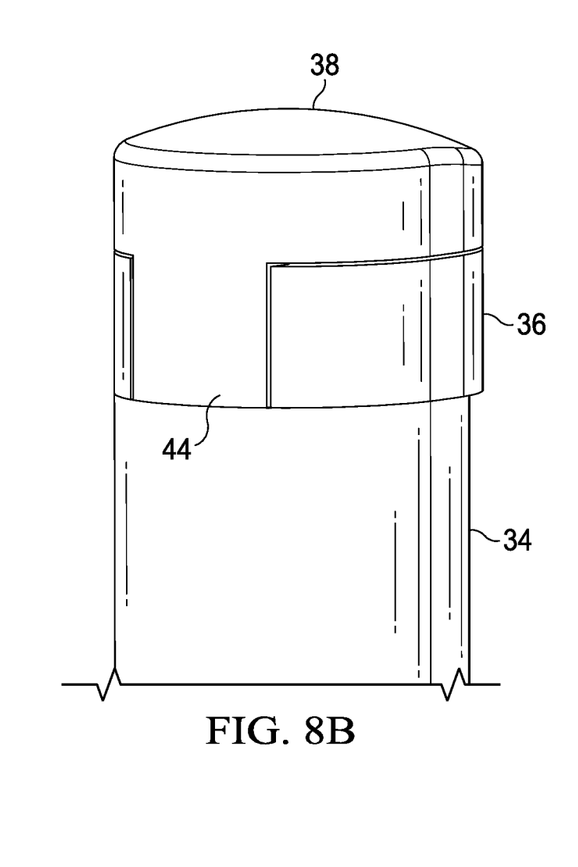

Referring now to FIGS. 8A, 8B, 8C, 8D, 8E and 8F, an alternative embodiment of the stylus end cap and flexible cap is depicted. FIG. 8A depicts a side perspective view of the stylus having an alternative arrangement for removing flexible cap 38 from end cap 36. In the alternative embodiment, a rib feature 74, such as a small indent under which a finger nail can fit, provides a location for application of leverage that rotates flexible cap 38 back towards the coupling location of the attachment member. End cap 36 fixedly couples flexible cap 38 along the axis of cylindrical housing 34 without the sliding motion described above. FIG. 8B depicts a side perspective view of the stylus at the coupling point of attachment member 44 to end cap 36 and cylindrical housing 34. An exposed length of attachment member 44 at end cap 36 flexes when flexible cap 38 is lifted off end cap 36 to provide access to the port within the opening. In the example embodiment, flexible cap 38 and attachment member 44 are injection molded as a single part with a thermoplastic elastomer (TPE) to provide the bending flexibility for rotating flexible cap 38 towards attachment member 44 without any sliding motion of attachment member 44 within end cap 36 and cylindrical housing 34.

Figure 8C:
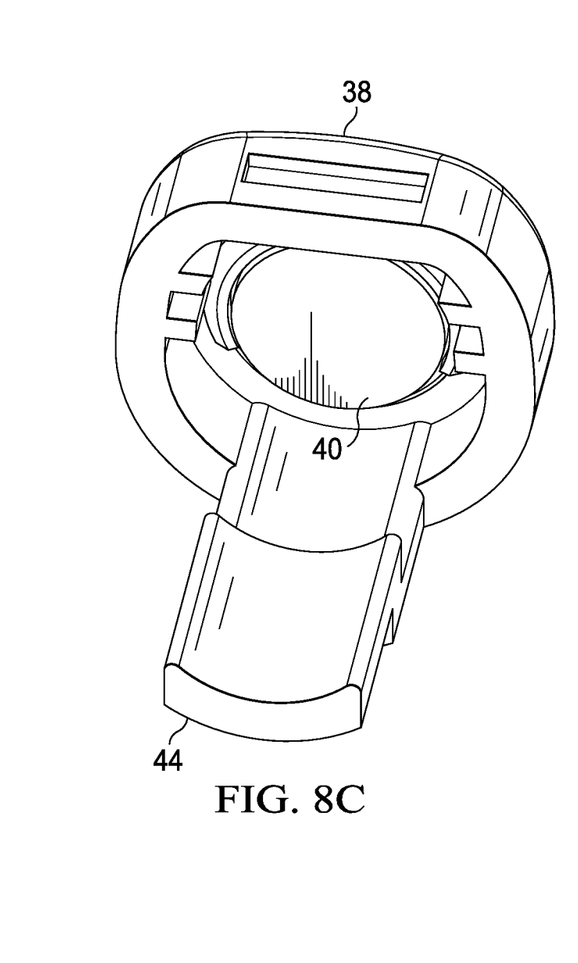
Figure 8D:
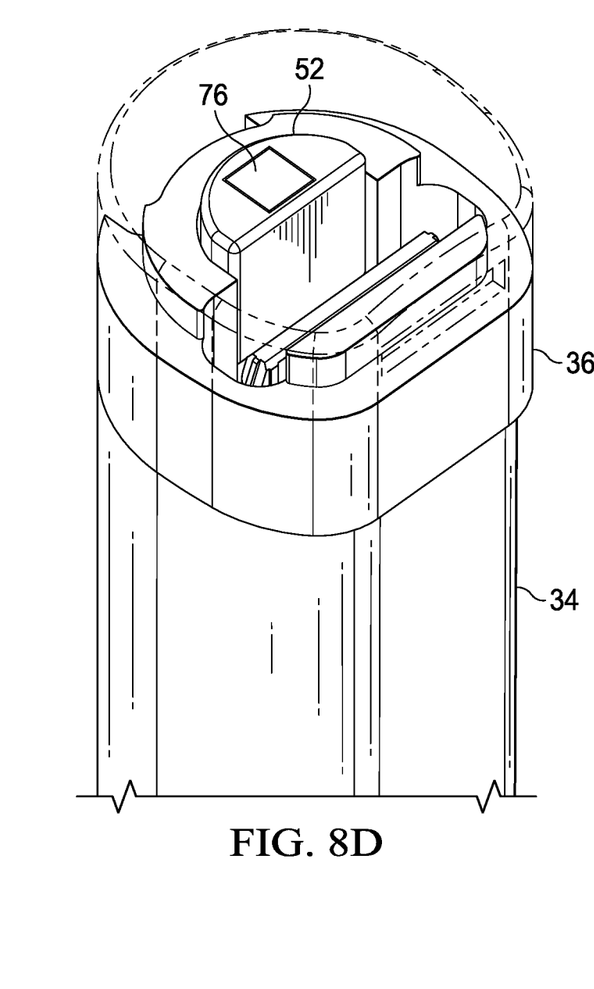
Figure 8E:
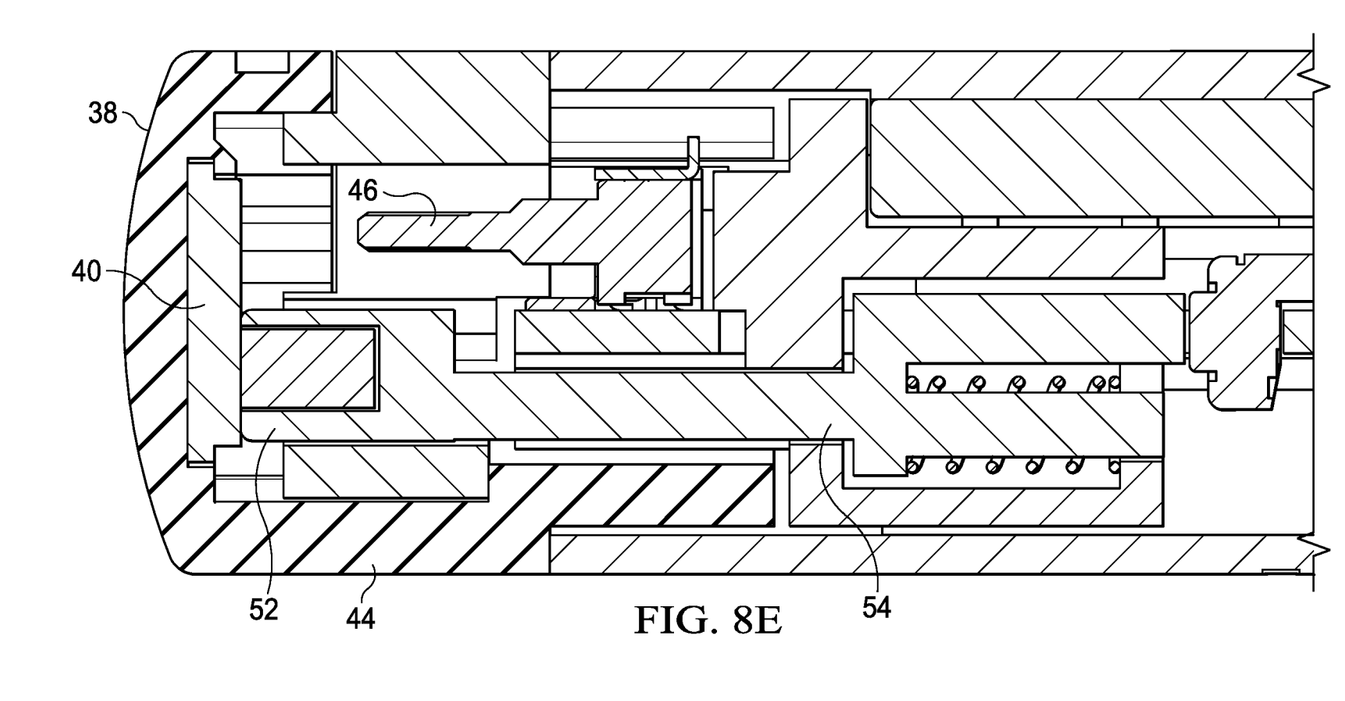
Figure 8F:
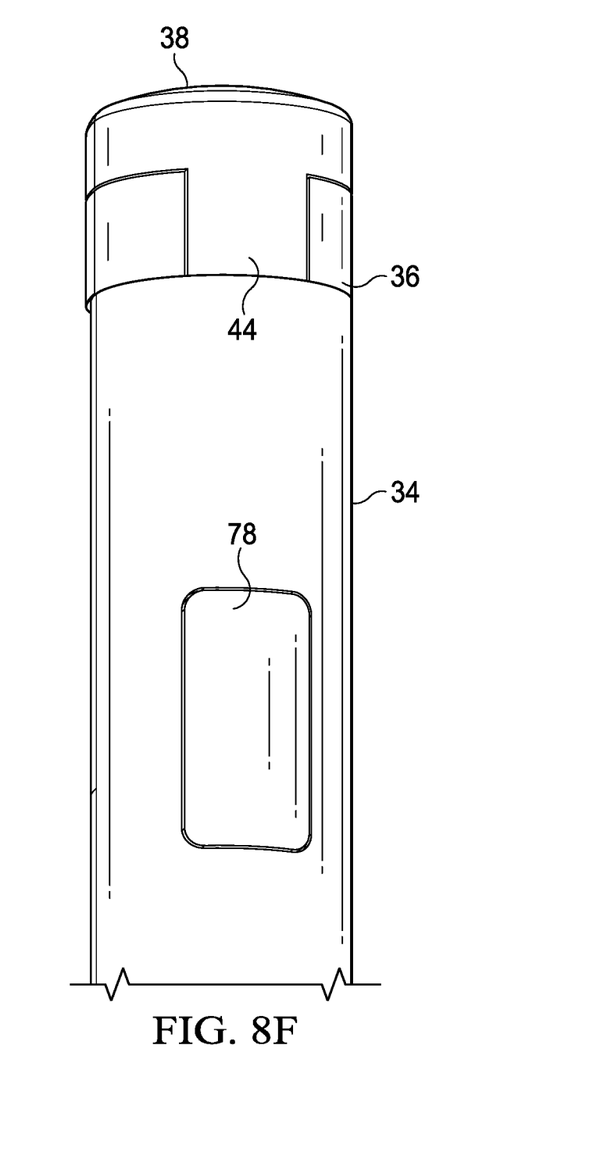

FIG. 8C depicts a perspective view of the interior or flexible cap 38. A metal plate 40 integrates in the inner surface of flexible cap 38, such as ferromagnetic steel plate. Attachment member 44 has linear edges and a bent form factor that fixedly couples between end cap 36 and cylindrical housing 34. FIG. 8D depicts the end of the stylus with the flexible cap removed. Actuation end 52 of the push button integrates a magnet 76 that magnetically attracts the steel plate to it when flexible cap 38 fits over the opening. The magnetic attraction aids in pulling the push button outwards from the interior of cylindrical housing 34 to help prevent inadvertent activation of the Bluetooth functionality. In addition, the magnetic attraction provides the end user with feedback regarding the position of the push button, which tends to remain biased against flexible cap 38. Port 46 has its position shifted slightly closer to the side of cylindrical housing 34 so that actuation end 52 is more centrally located to provide a more natural feel to an end user input. FIG. 8E depicts a cutaway view of the stylus with flexible cap 38 placed over the opening so that metal plate attracts actuation end 52 by magnetic attraction of magnet 76. Port 46 is disposed to the side of the push button away from attachment member 44 so that an end user can insert a charger cable with ease when flexible cap 38 folds back rotating at attachment member 44. Attachment member 44 has an L-shape at its termination that fixedly fits against cylindrical housing 34 to couple in place where a side opening in end cap 36 provides space for a rotational movement and folding. In addition, an elastomeric material of attachment member 44 provides stretching for additional room as needed to fit in a charging cable. FIG. 8F depicts a side view of the stylus with flexible cap 38 closed over the opening to cover the charger and push button and attachment member 44 exposed at end cap 36 where it has room to rotate and flex when flexible cap 38 is opened. A transmission window 78 is incorporated in cylindrical housing 34, such as a thermoplastic material, to provide a wireless signal transmission path from the Bluetooth transceiver located in cylindrical housing 34 to external wireless devices.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions to process information;
a memory disposed in the housing and interfaced with the processor to store the instructions and information;
a display integrated in the housing and interfaced with the processor, the display operable to present the information as visual images, the display having a touchscreen that detects touches and reports the touches to the processor as inputs; and
a stylus separate from the housing, the stylus having a cylinder housing terminating at a first end with a writing tip and at a second opposing end with an opening, a port disposed within the cylinder housing interior at the opening and configured to accept a cable, and a push button disposed proximate the port, the opening covered by a flexible cap, the flexible cap removeable to expose the port and flexible to accept actuation of the push button when in place over the port.

2. The information handling system of claim 1 further comprising:
a metal plate insert molded into the flexible cap;
wherein the metal plate aligns to press against the push button.

3. The information handling system of claim 1 wherein the push button comprises:
an actuation end disposed at the opening to accept an end user push;
a member extending from the actuation end into the cylinder housing interior to translate the end user push from the opening into the cylinder housing interior; and
a switch coupled to the cylinder housing and aligned with the member end to activate when the actuation end accepts an end user push.

4. The information handling system of claim 3 further comprising:
a spring disposed at the member to bias the actuation end towards the opening; and
a wireless communication device interfaced with the switch and configured to perform predetermined functions in response to the switch activation.

5. The information handling system of claim 1 wherein the flexible cap comprises a dome feature extending across the opening and an attachment member extending from one side and inserted into the opening.

6. The information handling system of claim 5 wherein the flexible cap comprises a rib protruding from a side opposite to lift the flexible cap off of the opening and rotate about the attachment member.

7. The information handling system of claim 6 wherein the attachment member includes plural ribs formed to have reduced thickness at bend locations of the attachment member.

8. The information handling system of claim 7 further comprising an end cap coupled to the cylinder housing at the opening to capture the attachment member, the end cap having a spacing at the attachment member to provide restricted movement of the flexible cap along an axis of the cylinder housing.

9. The information handling system of claim 8 wherein the push button is operable in part to command power application to an active capacitance source of the writing tip.

10. A method for managing a stylus input device, the method comprising:
writing on a touchscreen display with a writing tip exposed at a first end of a cylinder housing;
pressing on a flexible cap at a second end of the cylinder housing to actuate a button disposed in the cylinder housing under the flexible cap, the button commanding a function of a processing resource disposed in the cylinder housing;
removing the flexible cap to expose a port disposed in the cylinder housing; and
coupling a cable to the port.

11. The method of claim 10 further comprising:
providing power through the cable to the port;
charging a battery integrated in the cylinder housing with the power;
removing the cable from the port; and
replacing the flexible cap over the opening.

12. The method of claim 11 wherein:

removing the flexible cap further comprises rotating the flexible cap about an attachment member inserted in the cylinder housing and coupled in place with an end cap structure; and replacing the flexible cap further comprises rotating the flexible cap about the attachment member to cover the opening.

13. The method of claim 11 further comprising:

defining a sliding region of the attachment member within the end cap;

sliding the attachment member partially out of the cylindrical housing at the removing the flexible cap to lift the flexible cap away from the opening; and sliding the attachment member into the cylindrical housing at the replacing the flexible cap over the opening.

14. The method of claim 10 further comprising:

integrating a metal plate in the flexible cap aligned with the button; and translating presses at the flexible cap to the button through the metal plate.

15. The method of claim 10 further comprising:

interfacing the button with a switch disposed in the cylindrical housing through a member that extends past the port; and translating pushes at the button to the switch through the member.

16. The method of claim 15 wherein the function comprises wireless communication advertisement.

17. An information handling system stylus comprising:

a cylindrical housing;

a writing tip extending from a first end of the cylindrical housing and operable to place an input touch at a touchscreen display;

a port integrated in an opening formed at a second end of the cylindrical housing opposite the first end and operable to accept a cable;

a button disposed in the opening proximate the port and having a member extending into the interior of the cylindrical housing past the port;

a switch aligned with the member to detect presses of the button; and a flexible cap removably disposed over the opening to selectively expose and cover the port and button, presses at the flexible cap when covering opening translating as pushes to the button.

18. The information handling system stylus of claim 17 further comprising:

an end cap coupled to the second end; and an attachment member extending from flexible cap and into the opening, the attachment member having a sliding engagement with the end cap to move the flexible cap along an axis of the cylindrical housing towards and away from the opening.

19. The information handling system stylus of claim 17 further comprising:

a metal plate integrated in the flexible cap;

wherein the metal plate aligns with the button to translate presses at the flexible cap to the button.

20. The information handling system of claim 19 further comprising a rib extending out from one side of the flexible cap and aligned to lift the flexible cap from the opening.

* * * * *